(12) United States Patent
Guggolz et al.

(10) Patent No.: US 7,827,876 B2
(45) Date of Patent: Nov. 9, 2010

(54) METHOD FOR CONTROLLING, AND A CONTROL DEVICE OF, AN AUTOMATED, NON-SYNCHROMESH MULTISPEED MOTOR VEHICLE TRANSMISSION

(75) Inventors: Manfred Guggolz, Leonberg (DE); Werner Hillenbrand, Neuffen (DE); David Ulmer, Filderstadt (DE); Markus Veit, Pliezhausen (DE)

(73) Assignee: Daimler AG, Stuttgart (DE)

( * ) Notice: Subject to any disclaimer, the term of this patent is extended or adjusted under 35 U.S.C. 154(b) by 315 days.

(21) Appl. No.: 12/152,866

(22) Filed: May 16, 2008

(65) Prior Publication Data

US 2009/0000410 A1    Jan. 1, 2009

Related U.S. Application Data

(63) Continuation-in-part of application No. PCT/EP2006/010926, filed on Nov. 15, 2006.

(30) Foreign Application Priority Data

Nov. 17, 2005    (DE) .................. 10 2005 054 767

(51) Int. Cl.
*F16H 59/00* (2006.01)
(52) U.S. Cl. ....................................... 74/335
(58) Field of Classification Search ........................ None
See application file for complete search history.

(56) References Cited

U.S. PATENT DOCUMENTS

| 5,099,711 | A | * | 3/1992 | Langbo et al. ............ 74/336 R |
| 5,389,053 | A | * | 2/1995 | Steeby et al. ............... 477/123 |
| 5,899,829 | A | | 5/1999 | Salecker |
| 6,109,407 | A | * | 8/2000 | Bockmann et al. ......... 192/3.63 |
| 6,539,820 | B2 | * | 4/2003 | Markyvech ..................... 74/83 |
| 6,769,523 | B2 | * | 8/2004 | Muetzel et al. ............ 192/3.55 |
| 6,883,394 | B2 | * | 4/2005 | Koenig et al. ................. 74/335 |
| 7,691,029 | B2 | * | 4/2010 | Guggolz et al. ............. 477/174 |
| 2010/0044183 | A1 | * | 2/2010 | Guggolz et al. ............. 192/219 |

FOREIGN PATENT DOCUMENTS

| DE | 197 08 930 A1 | 9/1998 |
| EP | 0 608 978 A | 8/1994 |
| EP | 1 184 605 A2 | 3/2002 |

* cited by examiner

*Primary Examiner*—Dirk Wright
(74) *Attorney, Agent, or Firm*—Klaus J. Bach

(57) ABSTRACT

In a method for controlling, and a control device of, an automated non-synchromesh multi-speed motor vehicle transmission, wherein, upon selection of a target gear, a form-fitting connection is to be established between shift elements of the target gear, wherein, however, with a certain rotational speed difference between the shift elements which causes chattering, no engagement takes place during actuation of the shift actuator for the target gear, when, upon monitoring, a certain chattering of the shift elements is detected, and, as a result, the engagement of the target gear is aborted in order to prevent the transmission from being damaged.

13 Claims, 2 Drawing Sheets

METHOD FOR CONTROLLING, AND A CONTROL DEVICE OF, AN AUTOMATED, NON-SYNCHROMESH MULTISPEED MOTOR VEHICLE TRANSMISSION

This is a Continuation-In-Part application of pending International patent application PCT/EP2006/010926 filed Nov. 15, 2006 and claiming the priority of German patent application 10/2005 045 767.2 filed Nov. 17, 2005.

BACKGROUND OF THE INVENTION

The invention relates to a method for controlling an automated, non-synchromesh multispeed motor vehicle transmission and a control device of an automated, non-synchromesh multispeed transmission of a motor vehicle, for controlling the engagement of a target gear via a shift operator.

EP 0 161 521 A1 describes a method for controlling an automated, non-synchromesh multispeed transmission of a motor vehicle. In the method an engagement of a target gear is aborted if a predetermined period of time has elapsed since the process of engagement commenced, without being able to complete the engagement. In this case the transmission is brought into a neutral position.

In order to engage a gear in a non-synchromesh multispeed transmission, a positively interlocking connection must be established between gear-shifting elements of the target gear, such as a loose gear and a gearshift sleeve, through displacement of the gearshift sleeve. The loose gear is thereby torsionally locked to a shaft of the transmission. Since a non-synchromesh multispeed transmission does not have synchromesh devices for each gear, a gear can be engaged only when no great speed differential prevails between the gear-shifting elements, since otherwise the claws of the loose gear cannot mesh with the claws of the gearshift sleeve. The gearshift sleeve is engaged by a gearshift actuator pressing it against the loose gear, so that a contact is established between the claws. If meshing is impossible due to the speed differential between the gear-shifting elements, the claws repel one another against the force of the gearshift actuator, which can cause damage to the claws and hence to the multispeed transmission. This repulsion is referred to as so-called chattering.

It is the object of the present invention to provide a method for controlling, and a control device of, an automated non-synchromesh multispeed motor vehicle transmission which will prevent the multi-speed transmission being damaged during engagement of a target gear.

SUMMARY OF THE INVENTION

In a method for controlling, and a control device of, an automated non-synchromesh multi-speed motor vehicle transmission, wherein, upon selection of a target gear, a form-fitting connection is to be established between shift elements of the target gear, wherein, however, with a certain rotational speed difference between the shift elements which causes chattering, no engagement takes place during actuation of the shift actuator for the target gear, when, upon monitoring, a certain chattering of the shift elements is detected, and, as a result, the engagement of the target gear is aborted in order to prevent the transmission from being damaged.

According to the invention, activation of the gearshift actuator for engaging the target gear is monitored for the occurrence of any chattering of the gear-shifting elements of the target gear. Chattering can here be detected in various ways. For example, rotational speed signals of the gear-shifting elements of the target gear may be evaluated for this purpose. Another possible approach is to detect a shift travel signal characteristic of a shift travel of the gear-shift actuator and to evaluate said shift travel signal in order to monitor any chattering. Further methods for detecting any chattering, deemed suitable by the person skilled in the art, are also feasible.

As soon as chattering is detected, the engagement of the target gear is aborted. In this case the gearshift actuator and thereby the gearshift sleeve is brought into a neutral position, in which no contact exists between the gear-shifting elements of the target gear. Should an engagement still be necessary, a new attempt at engagement is initiated.

The multi-speed transmission is therefore reliably protected against damage, since as soon as any chattering is detected the engagement of the target gear is aborted, thereby putting an end to the chattering.

The gearshift actuator may here be embodied as a hydraulic or pneumatic piston-cylinder unit, for example, or as an electric motor.

In a particular embodiment of the invention, the gear-shift actuator may assume a neutral position, a shift position or an intermediate position situated between these. In the neutral position there is no contact between the gear-shifting elements of a gear. The gearshift actuator assumes the neutral position when no gear is to be engaged by means of the gearshift sleeve actuated thereby. In the shift position the positively interlocking connection is established between the gear-shifting elements of the target gear, so that the target gear is engaged or shifted. The gearshift actuator is situated in the intermediate position when it has left the neutral position but the target gear has not yet been engaged. In the intermediate position, therefore, contact and hence chattering of the gear-shifting elements can occur. The intermediate position is therefore not a precise position but rather extends over a range of possible positions of the gearshift actuator.

This ensures that chattering is monitored only when it can actually occur. As a result, the risk of a false detection of chattering is very low.

In a development of the invention, rotational speed signals of the gear-shifting elements of the target gear are evaluated in order to monitor any chattering by a first method. The rotational speeds may be measured directly by suitable sensors. It is likewise possible to measure rotational speeds of shafts which are drive-connected to the gear-shifting elements. For example, the rotational speeds of a transmission input shaft, a countershaft or a transmission output shaft may be measured. In conventional multispeed transmissions of the countershaft type, a loose gear of the target gear is connected to the transmission input shaft and the countershaft and a gearshift sleeve are connected to the transmission output shaft.

Chattering is detected, in particular, when a speed differential between the rotational speeds of the gear-shifting elements is greater than a first limit for a predefined period of time. Different limits may be used, according to whether the rotational speed of the loose gear is greater or less than the rotational speed of the gearshift sleeve. The limit may lie within a range of 80-120 rpm, for example. Instead of the rotational speeds of the gear-shifting elements, it is also possible to process the rotational speeds of the shafts drive-connected to the gear-shifting elements. The first limit must then be adjusted according to the transmission ratio between the gear-shifting element and the shaft. Said period of time may lie in a range between 40 and 50 ms, for example.

In a further development of the invention a substitute signal, which is evaluated in order to monitor any chattering, is determined from one or more of said rotational speed signals by extrapolation. For measuring the rotational speeds, pulses may be generated according to the rotational speed and the number of pulses per unit time evaluated. A pulse may be triggered by a flank of a gear wheel, for example. This means that a determination of the current rotational speed is possible only when a pulse is also triggered. From the number of teeth and the length of time since the last pulse, it is possible to determine the rotational speed of the gear wheel or the shaft. At a low rotational speed and with a small number of gear teeth it can take a disproportionately long time to trigger a pulse. If the last rotational speed value were to be retained until then, there would be the risk that the monitoring of any chattering would deliver false results. In order to prevent this, as soon as the rotational speed registered ceases to vary for a predetermined length of time, a substitute value may be extrapolated from the gradient of the rotational speed last determined. From the substitute values and the rotational speeds actually determined, a substitute signal is generated, which is used to monitor any chattering.

Here it is only possible to check the substitute signal. It is also possible to monitor the original signal and in addition the substitute signal. In this case, chattering is detected only when both signals fulfill the corresponding conditions.

The substitute signal can, in particular, be formed only under specific conditions. For example, the formation can be activated when the relevant rotational speed is less than a lower rotational speed limit and at the same time the gradient is less than a lower gradient threshold, for example −700 rpm/s. The calculation can be deactivated, for example, when the rotational speed is greater than an upper rotational speed limit or the gradient is greater than a upper gradient threshold, for example 0 rpm/s. The upper rotational speed limit may be greater than or equal to the lower rotational speed limit. With formation of the substitute signal deactivated, the substitute signal corresponds to the original signal.

In one embodiment of the invention, the monitoring of any chattering varies as a function of a temperature of the multi-speed transmission, for example a temperature of a transmission oil. At low temperatures it may happen that the rotational speed of a gear-shifting element, especially a loose gear, overshoots during the engagement of the target gear. This means that the rotational speed entirely traverses the rotational speed range in which engagement would be possible, and goes right beyond the other limit of the range. In these cases no chattering generally occurs and the engagement of the target gear can be completed. In order that chattering will not be wrongly detected in these cases, the monitoring is performed as a function of a temperature of the multispeed transmission. In particular, the period of time for which the speed differential of the rotational speeds of the gear-shifting elements needs to be greater than a first limit before chattering is detected is increased. At transmission temperatures of <0° C., for example, it may be 20 ms longer than at temperatures in excess of 0° C.

For example, a gradient of the speed differential between the rotational speeds of the gear-shifting elements of the target gear is determined. This gradient is evaluated in order to monitor any chattering. If the gradient indicates, for example, that the speed differential is rapidly diminishing, no chattering is detected and the engagement of the target gear is therefore not aborted. In this case the two rotational speeds are tending to approximate to one another, so that it is still to be expected that engagement of the target gear will be possible. If, on the other hand, the difference is not diminishing or is even increasing, an engagement can no longer be anticipated. In this case chattering is detected and the engagement is aborted.

A shift travel signal characteristic of a shift travel of the gearshift actuator may be registered. Said shift travel signal is evaluated in order to monitor any chattering by a second method. A local minimum and a local maximum of the shift travel signal, in particular, are registered. From these, a time interval and/or a shift travel differential between the local minimum and the local maximum is determined. The interval and the shift travel differential are in particular always determined between the last minimum or maximum and the newly determined maximum or minimum. The interval and the shift travel differential are then evaluated in order to monitor any chattering. Chattering is detected, in particular, if the time interval is less than a limit value and the shift travel differential is greater than a travel limit.

This provides a second method for detecting any chattering. The second method may be used instead of the first method or in combination with the first method. This is a particularly reliable way of determining any chattering.

Since any chattering is detectable only from the occurrence of multiple local minima and maxima, a characteristic value, in particular, is determined, which is increased if said time interval is less than an interval limit and/or said shift travel differential is greater than a travel limit. The characteristic value is reduced once a predetermined period of 10 or 20 ms, for example, has elapsed. It may alternatively or additionally be reduced if said time interval is not less than the interval limit and/or said shift travel differential is not greater than the travel limit. The interval limit and the travel limit may assume identical or different valves for the increase or reduction in the characteristic value. Chattering is detected if the characteristic value exceeds a threshold value.

For increasing the characteristic value, a fixed first value may be added to the previous characteristic value. Multiplying by a first factor greater than 1 is also feasible, however. For reducing the characteristic value, a fixed second value may be subtracted from the previous characteristic value. Multiplying by a second factor of less than 1 is also feasible, however.

It is also possible for chattering to be detected if a minimum number of minima and maxima have been detected within an observation period, the time interval of said minima and maxima being less than a limit value and shift travel differential being greater than a travel limit.

In order to permit a particularly reliable detection of any chattering, the first and the second methods may be combined.

For this purpose the preconditions for detection of chattering by the second method may be lower if chattering has already been detected by the first method. In particular, said threshold value, which said characteristic value must exceed, is lower than in the absence of chattering detected by the first method.

It is also possible for any chattering to be detected only once it has been detected by the first and the second method.

In addition it is possible for chattering to be detected only if it has been detected by the second method and the speed differential between the rotational speeds of the gear-shifting elements of the target gear is at the same time greater than a second limit. The first limit may here be equal to the first limit which is used in the first method. It may also differ from this, however.

Should said speed differential between the rotational speeds of the gear-shifting elements of the target gear be less than the second limit, chattering is detected, if it has been detected by the second method for a predetermined second period of time without interruption.

The invention is explained in the description and the drawings. Exemplary embodiments of the invention will be described and shown in simplified form in the drawing. They will be explained in more detail in the description on the basis of the accompanying drawing:

DESCRIPTION OF ADVANTAGEOUS EMBODIMENTS OF THE INVENTION

Figure 1:
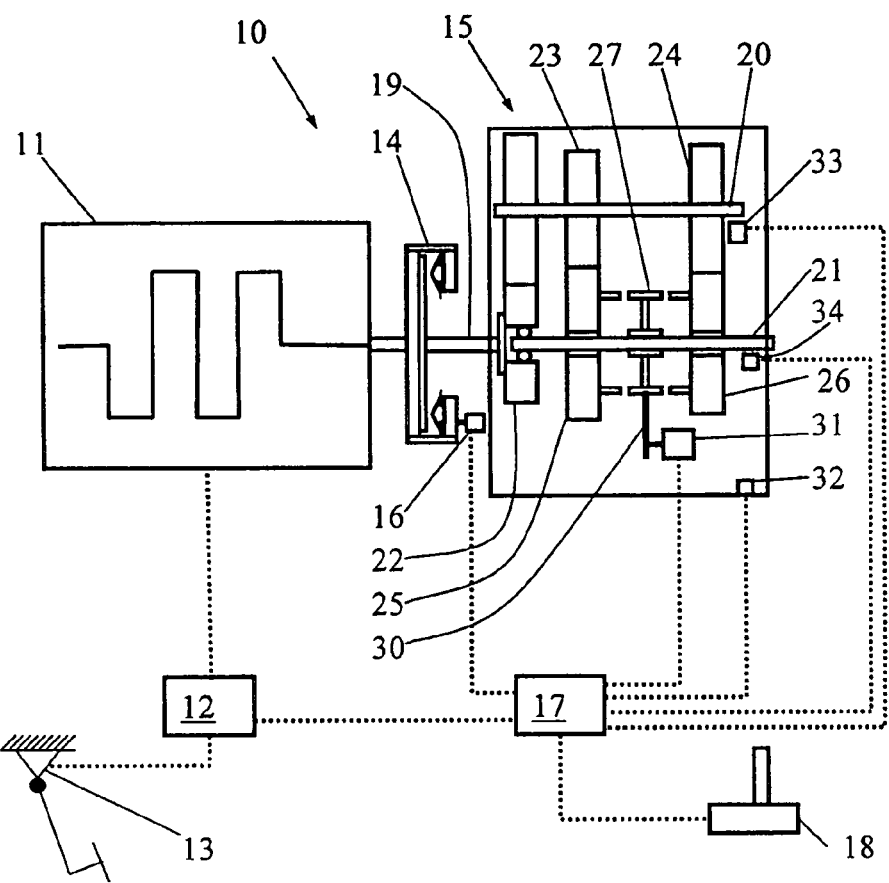
FIG. 1 shows a drivetrain of a motor vehicle having an automated, non-synchromesh multispeed transmission, FIG. 2a,b Shows rotational speeds of gear-shifting elements over time, and a shift travel of a gear-shift actuator of the multispeed transmission.

According to FIG. 1 a drivetrain 10 of a motor vehicle (not shown) has an engine 11, which is controlled by a control device 12. The control device 12 is signal-connected to a power control element 13, by means of which a driver of the vehicle can undertake settings for the adjustment of a throttle valve or a torque delivery of the engine 11.

The engine 11 is connected by means of an automated clutch 14 to an automated, non-synchromesh multispeed transmission 15. The clutch 14 serves to establish and to interrupt a power flow between the engine 11 and the multispeed transmission 15. The control device 17 is signal-connected to a gearshift lever 18, by means of which the driver of the vehicle can initiate gear shifts in the multispeed transmission 15. Alternatively, gear shifts can also be initiated by the control device 17 as a function of gear shift characteristics maps known in the art.

The multi-speed transmission 15 has a transmission input shaft 19, which is connected to the clutch 14, a countershaft 20 and a transmission output shaft 21, which is connected by way of a final drive unit (not shown) to driven wheels (not shown) of the motor vehicle. The transmission input shaft 19 is connected by means of a constant velocity joint 22 to the countershaft 20. Two fixed gears 23, 24 for the $1^{st}$ and $2^{nd}$ gears of the multispeed transmission 15 are arranged, rotationally fixed, on the countershaft 20. The fixed gears 23, 24 mesh with associated loose gears 25, 26, which are rotatably arranged on the transmission output shaft 21. A gearshift sleeve 27, arranged so that it is rotationally locked but axially moveable on the transmission output shaft 21, serves to rotationally lock either of the two loose gears 25, 26 to the transmission output shaft 21. For this purpose the loose gears 25, 26 and the gearshift sleeve 27 have claws (not shown), which enter into a positively interlocking connection on engagement of the respective gear. The loose gears 25, 26 and the gearshift sleeve 27 thereby constitute gear-shifting elements of the $1^{st}$ and $2^{nd}$ gears.

The gearshift sleeve 27 has a neutral position, which is shown in FIG. 1. Here the gearshift sleeve 27 is in contact neither with the loose gear 25 nor the loose gear 26. In addition, the gearshift sleeve 27 has a separate shift position for the $1^{st}$ and the $2^{nd}$ gears respectively. Said positively interlocking connection is established in the shift position. An intermediate setting is arranged between the neutral position and the respective shift position.

The gearshift sleeve 27 is connected by way of a connecting element 30 to a gearshift actuator 31 in the form of a hydraulic piston-cylinder unit. The necessary hydraulic lines, valves and hydraulic pump are not shown. The gear-shift actuator 31 is activated by the control device 17 by means of an activation signal. In addition, the gearshift actuator 31 registers the current position and hence the position of the gear-shifting element 27, and transmits these to the control device 17. The position of the gearshift actuator 31 characterizes a shift travel of the gearshift actuator. The gearshift sleeve 27 can thereby be axially displaced along the transmission output shaft 21 and the gears of the multispeed transmission 15 engaged and disengaged as determined by the control device 17.

The control device 17 is also signal-connected to a temperature sensor 32, which is arranged inside the multispeed transmission 15. The temperature sensor 32 serves to measure a temperature of a transmission oil of the multispeed transmission 15.

In addition, the control device 17 is signal-connected to rotational speed sensors 33 and 34. The rotational speed sensor 33 serves to measure the rotational speed of the countershaft 20 and thereby indirectly the rotational speeds of the loose gears 25 and 26. The rotational speed sensor 34 serves to measure the rotational speed of the transmission output shaft 21 and thereby the rotational speed of the gearshift sleeve 27.

The multi-speed transmission may have further gears, which can be engaged and disengaged via further gear-shifting elements. In this case, when shifting after the engagement of an original gear the gear-shifting element of the target gear is first selected by means of a selection actuator and the target gear then engaged.

As soon as the gearshift actuator 31 is activated for the engagement of a target gear, a monitoring step is performed to detect whether there is any chattering of the gear-shifting elements of the target gear.

For this purpose, a check is performed on whether the gearshift actuator 31 is in an intermediate position. This is done by checking whether the shift travel of the gear-shift actuator 31 is in a range between neutral position and shift position. If this is the case, a check is performed as to whether the differential between the rotational speeds of the gear-shifting elements of the target gear is greater than a first limit for longer than a first period of time. The duration of the first time period is 50 ms, for example, and the first limit is 100 rpm, for example. If the condition is fulfilled, a chattering of the gear-shifting elements is detected by the first method.

Figure 2A:
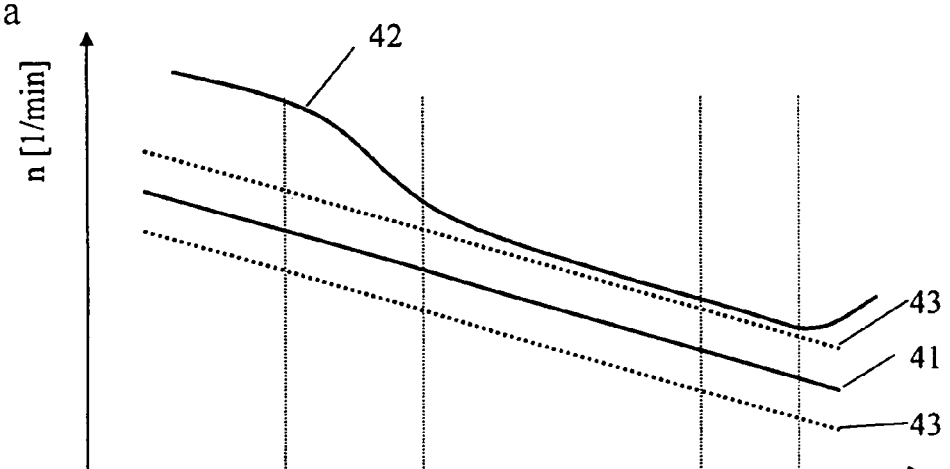

FIG. 2a shows examples of curve profiles for the rotational speeds of the gear-shifting elements over time. The line 41 shows the curve profile of the rotational speed signal of the gearshift sleeve 27. The rotational speed of the gearshift sleeve 27 is proportional to the speed of the motor vehicle. The line 42 shows the curve profile for the loose gear 25. The boundary lines 43 characterize a range around the rotational speed of the gearshift sleeve 27, within which the differential between the rotational speeds is less than the first limit.

Figure 2B:
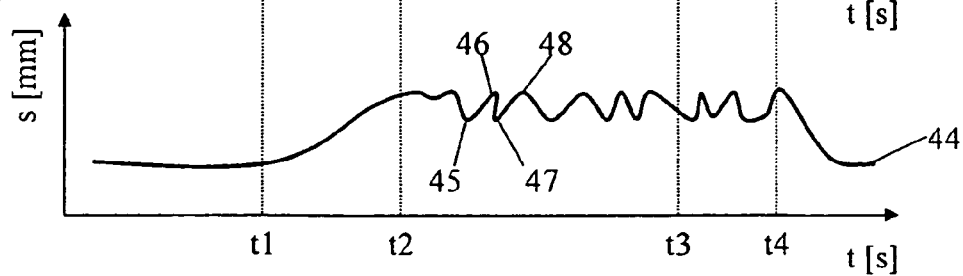

FIG. 2b shows the shift travel in [mm] of the gearshift actuator 31 (shift travel signal 44) over time.

Up to the time t1 the gearshift actuator is situated in the neutral position. From the time t1 the gearshift actuator is activated in order to engage the target gear. The shift travel increases and at time t2 the gearshift actuator reaches the intermediate position. Between the times t1 and t2 the rotational speed of the loose gear approximates to the rotational speed of the gearshift sleeve, without entering the range defined by the boundary lines 43, however. From time t2 it is examined whether the differential between the two rotational speeds is less than the first limit. As can be seen from FIG. 2a, this is never the case, so that at time t3 said period of time has elapsed and at time t3 chattering is detected by the first method.

In addition to the first method, chattering is also monitored by means of a second method. For this purpose, local minima and local maxima of the shift travel signal 44 are determined starting at the time t2, that is to say when the gearshift actuator 31 is in the intermediate position. The local minima 45 and 47 and the local maxima 46 and 48 are therefore determined. Upon each identification of a local minimum or maximum, the time interval from the previous maximum or minimum is determined. In addition the shift travel differential between the local minima and maxima is determined.

At each occurrence of a local minimum or maximum a characteristic value is updated. The characteristic value has the value 0 at the start of monitoring, that is to say, at time t2. It is also ensured that it is not less than 0. At the occurrence of a local minimum or maximum a check is performed as to whether said time interval from the preceding maximum or minimum is less than interval limit of 50 ms. At transmission temperatures of less than 0° C. the interval limit is 60 ms. A check is also performed as to whether said shift travel differential is greater than a travel limit. If both conditions are fulfilled, the characteristic value is increased by a value of 3. If one of the conditions is not fulfilled, the characteristic value is reduced by a value of 1.

Examination of the local minima or maxima is performed in a fixed cycle of 10 ms, for example. In each cycle the characteristic value is multiplied by a set factor of less than 1, for example by 0.75.

Should the characteristic value exceed a threshold value of 20, for example, chattering is detected by the second method. If chattering has already been detected by the first method (at time t3), however, the threshold value is reduced. The threshold value then has a value of 15, for example.

At time t4 the characteristic value becomes greater than the threshold value, that is to say greater than 15, so that chattering has been detected by the second method at time t4.

A conclusive decision as to the occurrence of chattering, which then also leads to abortion of the engagement of the target gear, is derived from a combination of the results of the first and second methods.

Chattering, which leads to a gear engagement sequence being aborted, is considered detected if:
  chattering has been detected by the first and the second method,
  chattering has been detected by the second method and at the same time the differential between two rotational speeds is greater than the first limit,
  uninterrupted chattering has been detected by the second method for a period of 50 ms, and at the same time the differential between the two rotational speeds is less than the first limit.

If chattering is detected on the basis of these rules, the engagement of the target gear is aborted and the gear-shift actuator is brought back into the neutral position. The control device of the multispeed transmission then checks whether engagement of the target gear is still necessary. If so, a further attempt is made to engage the target gear.

In measuring the rotational speed of the countershaft and hence in the indirect measurement of the rotational speed of the loose gear, large differences can occur between the actual and the measured rotational speed in the lower rotational speed ranges. The reason for this is that a current rotational speed can only be determined when a pulse is triggered by a tooth flank of the gear wheel used for the measurement. At low rotational speeds the interval between two pulses is very large. It may be greater than 50 ms, for example.

Using only the rotational speed signal generated by means of the measurement, it is not possible to reliably determine chattering by the first method at low rotational speeds of the countershaft. For this reason a substitute signal is determined, which is used in addition to the original rotational speed signal in order to monitor chattering. The substitute signal is used to verify the same conditions as the original rotational speed signal.

The substitute signal differs from the original rotational speed signal only in specific ranges. The differing method of determination is activated if the gradient of the original rotational speed signal is less than −700 rpm/s and at the same time the original rotational speed is greater than 800 rpm. It is deactivated if the gradient of the original rotational speed signal is greater than 0 rpm/s or the original rotational speed is greater than 800 rpm.

In order to determine the substitute signal differing from the original rotational speed signal, a check is performed to see that the original rotational speed signal does not vary for longer than a fixed period of time, for example 10 ms. If this condition is fulfilled, the substitute signal is extrapolated from the last rotational speed when a pulse occurred and the gradient between the rotational speeds when the penultimate and the last pulse occurred. If this condition is not fulfilled or if a new pulse is generated, the substitute signal corresponds to the original rotational speed signal.

The substitute signal is not claimed to reproduce the true curve profile of the rotational speed signal of the countershaft with the greatest possible accuracy. It is only intended to serve in preventing malfunctions in the monitoring of any chattering.

Figure 3:
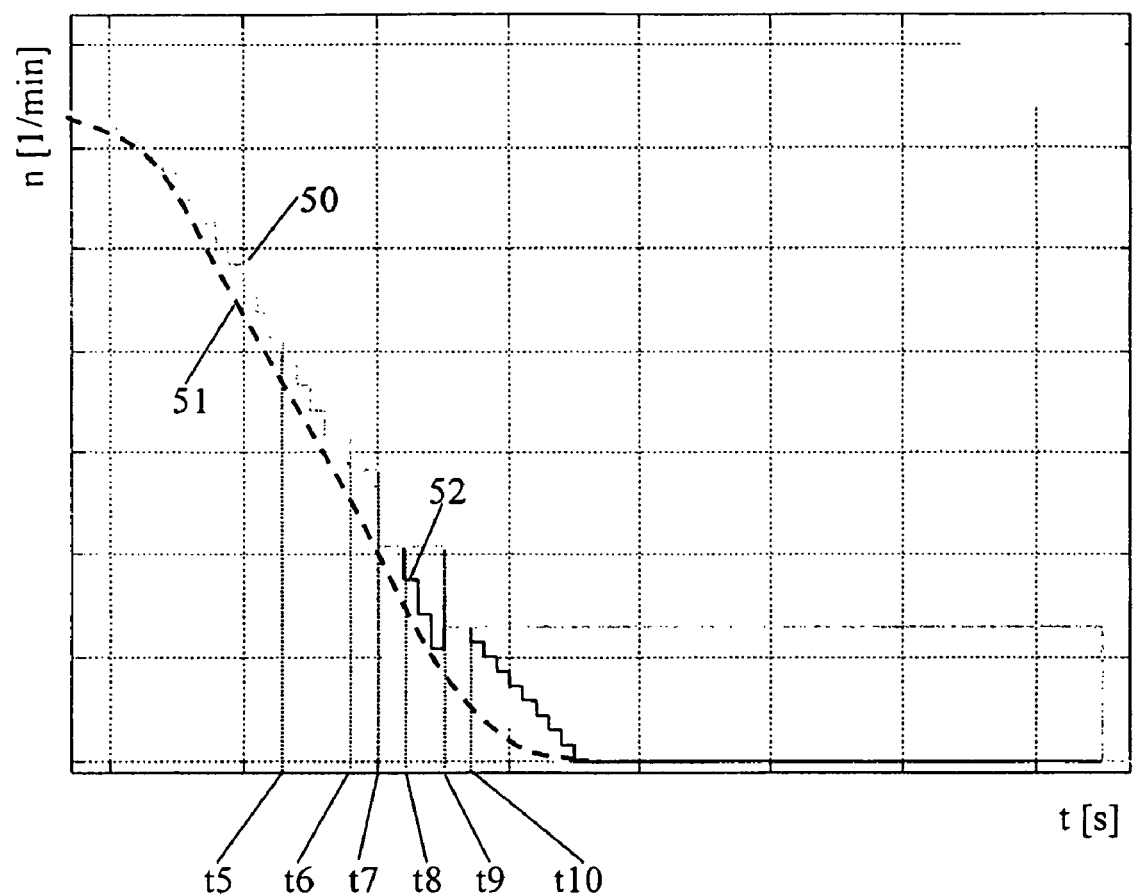
FIG. 3 shows a rotational speed signal over time and a substitute signal derived from this.

FIG. 3 shows examples of the curve profiles of an original rotational speed signal 50, a substitute signal 51 determined in the manner described and the estimated, actual rotational speed curve profile 52 of the countershaft during a braking of the countershaft to 0.

Up to time t5, although the gradient of the original rotational speed signal is less than −700 rpm/s, the values are greater than 800 rpm, so that the original rotational speed signal 50 is adopted as the substitute signal 51 without further calculations. From time t5 a check is performed as to whether the original rotational speed signal 50 remains unchanged for more than 10 ms. This first occurs at time t8. The gradient of the original rotational speed signal 50 is therefore determined between times t6 and t7, that is to say each of the times at which a pulse was generated. Using the rotational speed at time t8 and said gradient, the substitute signal is extrapolated until a pulse has again been generated at time t9. For this reason, at time t9 the substitute signal 51 reverts to the original signal 50. The two signals 50 and 51 are again identical until time t10, at which the original rotational speed signal 50 has again remained unchanged for more than 10 ms. From time t10 the substitute signal 51 is again extrapolated, as described.

What is claimed is:

1. A method for controlling an automated, non-synchromesh multispeed motor vehicle transmission having gear shifting elements (25, 26, 27) and a gear shift actuator (3), comprising the steps of:
  activating the gearshift actuator (31) for engaging a target gear by establishing a positively interlocking connection between gear-shifting elements (25, 26, 27) of the target gear,
  on activation of the gearshift actuator (31) for engaging the target gear, evaluating rotational speed signals (41, 42, 50) of the gear-shifting elements (25, 26, 27) of the target gear for the monitoring of any chattering, determining from one of said rotational speed signals (41, 42,

50) by extrapolation a substitute signal (51), which is evaluated in order to monitor an chattering, is determined, and at the occurrence of any chattering, aborting the engagement of the target gear.

2. The method as claimed in claim 1, wherein the gearshift actuator (31) has a neutral position, a shift position and an intermediate position arranged between the neutral and the shift positions, and said monitoring of any chattering is performed only when the gearshift actuator (31) is in the intermediate position.

3. The method as claimed in claim 1, wherein the monitoring is modified as a function of a temperature of the multispeed transmission (15).

4. The method as claimed in claim 1, wherein a gradient of the speed differential between the rotational speeds of the gear-shifting elements (25, 26, 27) of the target gear is determined, which is evaluated for monitoring any chattering.

5. A method for controlling an automated, non-synchromesh multispeed motor vehicle transmission having gear shifting elements (25, 26, 27) and a gear shift actuator (3), comprising the steps of:

activating the gearshift actuator (31)for engaging a target gear by establishing a positively interlocking connection between gear-shifting elements (25, 26, 27) of the target gear, on activation of the gearshift actuator (31) for engaging the target gear, evaluating rotational speed signals (41, 42, 50) of the gear-shifting elements (25, 26, 27) of the target gear for the monitoring of any chattering, determining a speed differential between the rotational speeds of the gear-shifting elements (25, 26, 27) of the target gear and, when chattering is detected if the speed differential is greater than a first limit for a predetermined first period of time, aborting the engagement of the target gear.

6. The method as claimed. in claim 5, wherein the monitoring is modified as a function of a temperature of the multispeed transmission (15).

7. The method as claimed in claim 5, wherein a gradient of the speed differential between the rotational speeds of the gear-shifting elements (25, 26, 27) of the target gear is determined, which is evaluated for monitoring any chattering.

8. A method for controlling an automated, non-synchromesh multispeed motor vehicle transmission having gear shifting elements (25, 26, 27) and a gear shift actuator (3), comprising the steps of:

activating the gearshift actuator (31) for engaging a target gear by establishing a positively interlocking connection between gear-shifting elements (25, 26, 27) of the target gear, on activation of the gearshift actuator (31) for engaging the target gear, monitoring the transmission for the occurrence of chattering of the gear-shifting elements (25, 26, 27) of the target gear, determining a shift travel signal (44) indicative of a shift travel distance of the gearshift actuator (31) and evaluating said shift travel signal (44) for the monitoring of any chattering determining, a local minimum (45, 47) and a local maximum (46, 48) of the shift travel signal (44), determining at least one of a time interval and a shift travel differential between the local minimum (45, 47) and the local maximum (46, 48) and evaluating said time interval and respectively, said shift travel differential for the monitoring of the chattering and at the determination of any chattering, aborting the engagement of the target gear.

9. The method as claimed in claim 8, wherein
a characteristic value is determined,
which is increased if at least one of said time interval is less than an interval limit and said shift travel differential is greater than a travel limit and
which is reduced when at least one of a predefined period of time has elapsed, said time interval is not less than the interval limit and said shift travel differential is not greater than the travel limit and
chattering is detected if the characteristic value exceeds a threshold value.

10. The method as claimed in claim 8, wherein chances for a detection of chattering by the second method are lower, in particular said threshold value is lower, if chattering has already been detected by the first method.

11. The method as claimed in claim 8, wherein chattering is detected only if it is detected by both, that is, the first and the second methods.

12. The method as claimed in claim 8, wherein the speed differential between the rotational speeds of the gear-shifting elements (25, 26, 27) of the target gear is at the same time greater than a second limit.

13. The method as claimed in claim 8, wherein, if the speed differential between the rotational speeds of the gear-shifting elements (25, 26, 27) of the target gear is less than the second limit, chattering is detected, if it has been detected for a predetermined second period of time without interruption.

* * * * *